(12) United States Patent
Kim et al.

(10) Patent No.: US 8,716,415 B2
(45) Date of Patent: May 6, 2014

(54) METHOD FOR PREPARING SUPPORTED METALLOCENE CATALYST AND SUPPORTED METALLOCENE CATALYST PREPARED USING THE SAME

(75) Inventors: Hyeon-Gook Kim, Daejeon (KR);
Ki-Soo Lee, Daejeon (KR);
Eun-Kyoung Song, Daejeon (KR);
Yong-Ho Lee, Incheon (KR); Dae-Sik Hong, Gunpo-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/502,507

(22) PCT Filed: Oct. 19, 2010

(86) PCT No.: PCT/KR2010/007155
§ 371 (c)(1),
(2), (4) Date: Jun. 8, 2012

(87) PCT Pub. No.: WO2011/049349
PCT Pub. Date: Apr. 28, 2011

(65) Prior Publication Data
US 2012/0252991 A1 Oct. 4, 2012

(30) Foreign Application Priority Data
Oct. 19, 2009 (KR) .................. 10-2009-0099449
Oct. 14, 2010 (KR) .................. 10-2010-0100307

(51) Int. Cl.
*C08F 4/642* (2006.01)
*C08F 4/653* (2006.01)
*C08F 4/655* (2006.01)
*C08F 4/6592* (2006.01)

(52) U.S. Cl.
USPC ........... 526/114; 526/113; 526/129; 526/160; 526/165; 526/943; 502/103; 502/104; 502/113; 502/152

(58) Field of Classification Search
USPC ................. 526/113, 114, 129, 160, 165, 943; 502/103, 104, 110, 113, 152
See application file for complete search history.

(56) References Cited

U.S. PATENT DOCUMENTS 6,153,551 A 11/2000 Kissin et al.
6,346,586 B1 * 2/2002 Agapiou et al. .............. 526/160

FOREIGN PATENT DOCUMENTS

| CN | 1910207 A | 2/2007 |
|---|---|---|
| KR | 10-0690345 B1 | 3/2007 |
| KR | 10-2009-0063799 A | 6/2009 |
| WO | 2006/060544 A1 | 6/2006 |

OTHER PUBLICATIONS

Kristen, M. O. "Supported Metallocene Catalysts with MAO and Boron Activators" In: Topics In Cat., 1999, vol. 7, pp. 89-95. 90-93.
Smit, M., et al., "Effects of Methylaluminoxane Immobilization on Silica on the Performance of Zirconocene Catalysts in Propylene Polymerization", In: J. Polym. Sci.: Part A: Polym. Chem. 2005, vol. 43, pp. 2734-2748, 2737-2743. 2745.

* cited by examiner

*Primary Examiner* — Caixia Lu
(74) *Attorney, Agent, or Firm* — McKenna Long & Aldridge, LLP

(57) ABSTRACT

The present invention provides a method for preparing a supported metallocene catalyst, a supported metallocene catalyst prepared by the method, and a method for preparing a polyolefin using the supported metallocene catalyst. The supported metallocene catalyst according to the present invention contains catalyst components uniformly distributed deep into the whole porous carrier particles to secure a high catalytic activity and facilitates polymerization of polyolefins with high bulk density.

17 Claims, No Drawings

METHOD FOR PREPARING SUPPORTED METALLOCENE CATALYST AND SUPPORTED METALLOCENE CATALYST PREPARED USING THE SAME

This application is a National Stage Entry of International Application No. PCT/KR2010/007155, filed Oct. 19, 2010, and claims the benefit of Korean Application Nos. 10-2009-0099449, filed on Oct. 19, 2009, and 10-2010-0100307, filed on Oct. 14, 2010, which are hereby incorporated by reference for all purposes as if fully set forth herein.

TECHNICAL FIELD

The present invention relates to a method for preparing a supported metallocene catalyst useful for preparation of polyolefins, a supported metallocene catalyst prepared by the method, and a method for preparing a polyolefin using the supported metallocene catalyst.

BACKGROUND ART

The metallocene catalyst system is a combination of a main catalyst consisting of a transition-metal compound having a central group 4 metal and a co-catalyst consisting of an organometallic compound having a group 13 metal such as aluminum as a principal component. Due to its single-site catalytic characteristic, the metallocene catalyst system can be used to prepare polymers such as polyolefins with narrow molecular weight distribution.

The molecular weight and the molecular weight distribution of polyolefins are critical factors that determine the physical characteristics, and the flowability and mechanical characteristics affecting the workability of the polymers. For fabrication of various polyolefin products, it is important to enhance the melt workability of the polymer by controlling the molecular weight distribution of the polymer. In particular, toughness, strength, environment stress cracking resistance, or the like are of a great importance for polyethylene. Thus, there has been suggested a method of enhancing the mechanical properties and the workability in low molecular weight moiety of resins with high molecular weight by polymerizing polyolefins having bimodal or wide molecular weight distribution.

On the other hand, the industrial techniques for synthesis of polyolefins are classified into high pressure process, solution process, slurry process, and gas phase process. The development of metallocene catalysts has driven many attempts to produce different polyolefins by varying the type of the metallocene catalyst according to one of those techniques. The polymerization techniques most frequently used with metallocene catalysts are solution process, gas phase process, and slurry process. Among these, the gas phase process or the slurry process requires it to control the bulk density of the polymer to a great extent for the sake of increasing the yield per volume of the polymerization reactor and to prevent reactor fouling associated with polymer deposition on the wall of the reactor for continuous operation of the reactor. The most popular method of increasing the bulk density of the polymer such as polyolefin and preventing reactor fouling is immobilizing a homogeneous metallocene catalyst on a solid carrier such as silica or alumina. In many cases, however, the use of a supported catalyst for polymerization of polyolefin to increase the bulk density of the polymer may cause deterioration of the catalytic activity.

SUMMARY OF THE INVENTION

Thus, the present invention provides a method for preparing a supported metallocene catalyst which has a high catalytic activity and is useful to synthesize polyolefins with high bulk density, and a supported metallocene catalyst prepared by the method.

Further, the present invention provides a method for preparing a polyolefin using the supported metallocene catalyst.

The present invention provides a method for preparing a supported metallocene catalyst that comprises: first immobilizing part of a co-catalyst on a carrier at a first temperature; second immobilizing the remainder of the co-catalyst on the carrier at a second temperature lower than the first temperature; and immobilizing a metallocene compound on the carrier.

The present invention also provides a supported metallocene catalyst prepared by the above method.

Further, the present invention provides a method for preparing a polyolefin that comprises polymerizing an olefin-based monomer in the presence of the supported metallocene catalyst.

DETAILED DESCRIPTION OF THE EMBODIMENTS

Hereinafter, a description will be given as to a method for preparing a supported metallocene catalyst, and a supported metallocene catalyst prepared by the method according to embodiments of the present invention.

In accordance with one embodiment of the invention, there is provided a method for preparing a supported metallocene catalyst that comprises: first immobilizing part of a co-catalyst on a carrier at a first temperature; second immobilizing the remainder of the co-catalyst on the carrier at a second temperature lower than the first temperature; and immobilizing a metallocene compound on the carrier.

In the preparation method, the total amount of the co-catalyst to immobilize is divided into two equals, which are sequentially immobilized on the carrier at a high temperature (the first temperature) and at a low temperature (the second temperature), respectively. The inventors of the present invention have discovered and supported by experimental results the idea that the preparation method for supported metallocene catalyst which involves immobilizing a co-catalyst in two divided equals and then a metallocene compound can not only provides a supported metallocene catalyst with higher catalytic activity even using a relatively small amount of the co-catalyst but also allows synthesis of polyolefins with higher bulk density.

The reason of the results presumably is that the first immobilization at high temperature helps immobilize the co-catalyst deep in the pores of the carrier, while the second immobilization at low temperature allows the co-catalyst immobilized uniformly around the surface of the carrier. For example, part of the co-catalyst immobilized deep in the pores of the carrier by the first immobilization at high temperature contributes to synthesis of a polyolefin with higher bulk density, and part of the co-catalyst immobilized uniformly around the surface of the carrier improves the activity of the catalyst. Thus the catalyst prepared by the above method, although formed using a small amount of a co-catalyst, can contain the co-catalyst distributed uniformly on the whole carrier and penetrating deep in the pores of the carrier, thereby acquiring high catalytic activity and allowing synthesis of polyolefins with high bulk density.

Further, the supported metallocene catalyst, which includes a metallocene compound immobilized on a carrier, can facilitate the synthesizing process of polymers such as polyolefins without causing reactor fouling or plugging in the flow channel of the reactor.

In the preparation method, the first temperature at which the first immobilization of the co-catalyst occurs may be in the range of 60 to 100° C., preferably 70 to 90° C. On the other hand, the second temperature for the second immobilization of the co-catalyst is 25 to 55° C., preferably 30 to 50° C. In this case where the preparation method involves the first and second immobilization steps conducted at the first and second temperatures, respectively, the co-catalyst can be immobilized deep into the pores of the carrier in uniform distribution through the first immobilization at high temperature, and the supported metallocene catalyst thus prepared can be used to produce polyolefins with high bulk density. Further, the co-catalyst can be immobilized uniformly around the surface of the carrier through the second immobilization at low temperature to enhance the catalytic activity of the supported metallocene catalyst.

In the preparation method according to the embodiment, the co-catalyst may be immobilized in at least two steps, or in at least three steps. In the latter case, the immobilization process of the co-catalyst should be conducted at least in the order of a high-temperature immobilization step corresponding to the first immobilization and then subsequent low-temperature immobilization steps corresponding to the second immobilization.

The weight ratio of the co-catalyst used in the first immobilization step to the co-catalyst in the second immobilization step may be in the range of 3:7 to 7:3, preferably 4:6 to 6:4. Using the co-catalyst immobilized at the weight ratio within the defined range can not only provide preparation of a supported metallocene catalyst with high catalytic activity but also allow synthesis of polyolefins with high bulk density using the supported metallocene catalyst.

In the preparation method, the immobilized amount of the co-catalyst is preferably, if not specifically limited to, 6 to 10 mmol per 1 g of the carrier. Here, the first and second immobilization times may be controlled appropriately according to the amount of the co-catalyst to immobilize.

The contact reaction between the co-catalyst and the carrier used to immobilize the metallocene compound on may be conducted with or without a solvent. The specific examples of the solvent as used herein may include aliphatic hydrocarbon solvents, such as hexane or pentane, aromatic hydrocarbon solvents, such as toluene or benzene, chlorine-substituted hydrocarbon solvents such as dichloromethane, ether-based solvents, such as diethylether or THF, or the most of other organic solvents, such as acetone, ethylacetate, or the like. The preferred solvents are hexane, heptane, toluene, or dichloromethane.

The reaction temperature between the co-catalyst and the carrier is as defined above. The reaction temperature between the metallocene compound and the carrier is in the range of −30 to 150° C., preferably room temperature to 100° C., more preferably 30 to 80° C. The supported catalyst after the reaction may be subjected to filtration or distillation under reduced pressure and then used as it is, or if necessary, after soxhlet extraction with an aromatic hydrocarbon such as toluene.

In the preparation method of a supported metallocene catalyst, the co-catalyst may be a metallic compound comprising a group 13 metal atom, such as Al, Ga, In, or Ti, preferably a compound represented by the following formula 1. Without any specific limitation, the catalyst may be selected from those typically used to polymerize olefins in the presence of a metallocene catalyst. Upon immobilization of the co-catalyst on a carrier, the hydroxyl groups of the carrier form a bonding with the group 13 metal atom.

$$-[Al(R15)-O]_a-\qquad\text{[Formula 1]}$$

In the formula 1, R15 is the same or different and is independently halogen or halogen-substituted or unsubstituted C1-C20 hydrocarbyl; and a is an integer of 2 or greater. The halogen as used herein may include, but not limited to, Cl or Br.

More specifically, the compound of the formula 1 may include methylaluminoxane (MAO), ethylaluminoxane, isobutylaluminoxane, butylaluminoxane, or the like.

In the preparation method of a supported metallocene catalyst according to the embodiment, the surface of the carrier may include hydroxyl groups, the amount of which is preferably 0.1 to 10 mmol/g, more preferably 0.5 to 1 mmol/g. The amount of the hydroxyl groups on the surface of the carrier may be controlled according to the preparation method or conditions, or drying conditions, such as drying temperature, drying time, or drying type (e.g., vacuum or spray drying).

The amount of hydroxyl groups less than 0.1 mmol/g may reduce the number of reaction sites; whereas the amount of hydroxyl groups more than 10 mmol/g may undesirably result from the existence of water other than hydroxyl groups on the surface of the carrier.

The surface of the preferred carrier has both hydroxyl groups and siloxane groups, which are highly active. The specific examples of the carrier may include those carriers dried at high temperature, such as silica, silica-alumina, or silica-magnesia. Generally, those carriers may contain oxides (e.g., $Na_2O$, $K_2CO_3$, $BaSO_4$, or $Mg(NO_3)_2$), carbonates, sulfates, or nitrates.

The carrier is preferably dried out sufficiently prior to immobilization. The drying temperature for the carrier is preferably 200 to 800° C., more preferably 300 to 600° C., most preferably 300 to 400° C. The carrier drying temperature below 200° C. remains an excess of water, which possibly reacts with the co-catalyst; whereas the carrier drying temperature above 800° C. combines together the pores on the surface of the carrier to reduce the surface area and also leaves siloxane groups with little hydroxyl groups on the surface, undesirably decreasing the number of reaction sites with the co-catalyst.

In the preparation method for supported metallocene catalyst, the metallocene compound to be immobilized on the carrier supporting the co-catalyst may be a metallocene compound alone or a mixture of at least two metallocene compounds. For example, the step of immobilizing the metallocene compound on a carrier includes immobilizing a first metallocene compound on the carrier; and immobilizing a second metallocene compound on the carrier. Here, the immobilized amount of the first or second metallocene compound is preferably 0.05 to 0.2 mmol per 1 g of the carrier. Further, the first and second metallocene compounds may react with the carrier at a reaction temperature of −30 to 150° C., preferably room temperature to 100° C., most preferably 30 to 80° C.

The immobilization of a plurality of metallocene compounds can more contribute to the enhanced catalytic activity of the supported catalyst and the increased bulk density of the polyolefin.

In case of using at least two different metallocene compounds, the first metallocene compound preferably includes a compound of the following formula 2, the second metallocene compound including a compound of the following formula 3 or 4:

$$(C_5R^a)_p(C_5R^b)MQ_{3-p}\qquad\text{[Formula 2]}$$

In the formula 2, M is a group 4 transition metal atom; $C_5R^a$ and $C_5R^b$ are the same or different and are independently a cyclopentadienyl ligand of a group 14 metal atom substituted with at least one functional group selected from the group consisting of hydrogen, alkyl, cyclalkyl, aryl, alkenyl, alkylaryl, arylalkyl, arylalkenyl, and hydrocarbyl, where two adjacent carbon atoms of C₅ may be bonded together via hydrocarbyl to form at least one ring containing 4 to 16 carbon atoms; Q is selected from the group consisting of halogen, alkyl, alkenyl, aryl, alkylaryl, arylalkyl, and alkylidene; and p is 0 or 1.

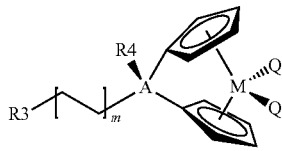

[Formula 3]

In the formula 3, M is a group 4 transition metal atom; R3 and R4 are the same or different and are independently hydrogen, C1-C20 alkyl, C2-C20 alkenyl, C6-C20 aryl, C7-C40 alkylaryl, C7-C40 arylalkyl, C1-C20 alkylsilyl, C6-C20 arylsilyl, mthoxymethyl, t-butoxymethyl, tetrahydropyranyl, tetrahydrofuranyl, 1-ethoxyethyl, or 1-methyl-1-methoxyethyl; A is selected from the group consisting of C2-C4 alkylene, C1-C4 alkyl silicon or germanium, and C1-C4 alkyl phosphine or amine; Q is the same or different and is independently selected from the group consisting of halogen, C1-C20 alkyl, C2-C10 alkenyl, C7-C40 alkylaryl, C7-C40 arylalkyl, C6-C20 aryl, substituted or unsubstituted C1-C20 alkylidene, substituted or unsubstituted amino, C2-C20 alkylalkoxy, and C7-C40 arylalkoxy; and m is an integer from 0 to 10.

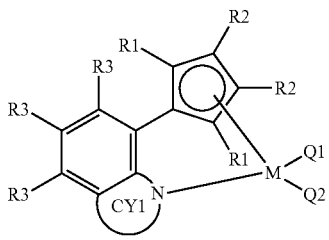

[Formula 4]

Applicants state that no new matter has been added to this amendment.

In the formula 4, R1 and R2 are the same or different and are independently hydrogen, C1-C20 alkyl, C2-C20 alkenyl, C6-C20 aryl, silyl, C7-C20 alkylaryl, C7-C20 arylalkyl, or hydrocarbyl-substituted metalloid of a group 4 metal atom, where R1 and R2, or two of R2s may be bonded together via alkylidine containing C1-C20 alkyl or C6-C20 aryl to form a ring; R3 is the same or different and is independently hydrogen, halogen, C1-C20 alkyl, C2-C20 alkenyl, C6-C20 aryl, C7-C20 alkylaryl, C7-C20 arylalkyl, C1-C20 alkoxy, C6-C20 aryloxy, or amido, where at least two of R3s may be bonded together to form an aliphatic or aromatic ring; CY1 is a substituted or unsubstituted aliphatic or aromatic ring, where CY1 may be further substituted with at least one substituent selected from the group consisting of halogen, C1-C20 alkyl, C2-C20 alkenyl, C6-C20 aryl, C7-C20 alkylaryl, C7-C20 arylalkyl, C1-C20 alkoxy, C6-C20 aryloxy, and amido, where if plural, at least two of the substituents may be bonded together to form an aliphatic or aromatic ring; M is a group 4 transition metal atom; and Q1 and Q2 are the same or different and are independently halogen, C1-C20 alkyl, C2-C20 alkenyl, C6-C20 aryl; C7-C20 alkylaryl, C7-C20 arylalkyl, C1-C20 alkyl amido, C6-C20 aryl amido, or C1-C20 alkylidene.

In the compound of the formula 2 which is an example of the first metallocene compound, at least one hydrogen contained in $R^a$ and $R^b$ may be substituted with at least one radical selected from the group consisting of compounds represented by the following formulas a, b and c:

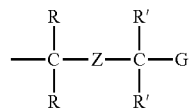

[Formula a]

In the formula a, Z is oxygen or sulfur; R and R' are the same or different and are independently selected from the group consisting of hydrogen, alkyl, cycloalkyl, aryl, alkenyl, alkylaryl, arylalkyl, and arylalkenyl, where two of R's may be bonded together to form a ring; and G is selected from the group consisting of alkoxy, aryloxy, alkylthio, arylthio, and substituted or unsubstituted phenyl, where G may be bonded to R' to form a ring. G is alkoxy or aryloxy when Z is sulfur; and Z is oxygen when G is alkylthio, arylthio, or substituted or unsubstituted phenyl.

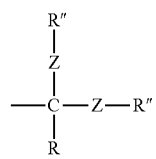

[Formula b]

In the formula b, Z is oxygen or sulfur, where at least either one of two Z is oxygen; and R and R" are the same or different and are independently selected from the group consisting of hydrogen, alkyl, cycloalkyl, aryl, alkenyl, alkylaryl, arylalkyl, and arylalkenyl, where R may be bonded to R" to form a ring, and two of R"s may be bonded together to form a ring, when two of R"s are not hydrogen.

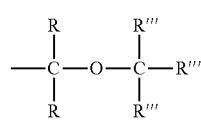

[Formula c]

In the formula c, R and R''' are the same or different and are independently selected from the group consisting of hydrogen, alkyl, cycloalkyl, aryl, alkenyl, alkylaryl, arylalkyl, and arylalkenyl, where adjacent two of R'''s may be bonded together to form a ring. When at least one of R is hydrogen, none of R''' is hydrogen. When at least one of R''' is hydrogen, none of R is hydrogen.

Preferably, the compound of the formula 3 which is an example of the second metallocene compound may be a compound represented by the following formula 5:

[Formula 5]

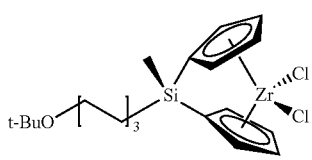

5

Further, the compound of the formula 4 as an example of the second metallocene compound may be a compound represented by the following formula 6 or 7, which is favored for the sake of controlling the electronic and stereoscopic environments around the metal atom:

[Formula 6]

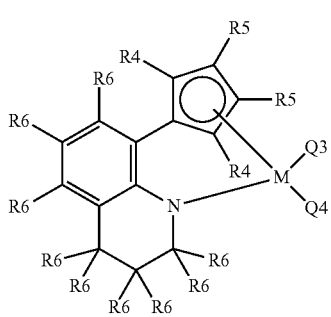

[Formula 7]

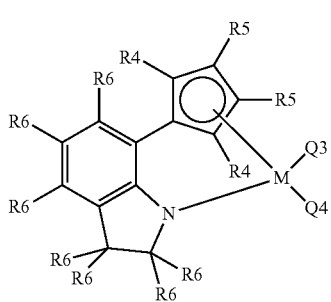

In the formula 6 or 7, R4 and R5 are the same or different and are independently hydrogen, C1-C20 alkyl, C6-C20 aryl, or silyl; C6 is the same or different and is independently hydrogen, C1-C20 alkyl, C2-C20 alkenyl, C6-C20 aryl, C7-C20 alkylaryl, C7-C20 arylalkyl, C1-C20 alkoxy, C6-C20 aryloxy, or amido, where at least two of R6s may be bonded together to form an aliphatic or aromatic ring; Q3 and Q4 are the same or different and are independently halogen, C1-C20 alkyl, C1-C20 alkyl amido, or C6-C20 aryl amido; and M is a group 4 transition metal atom.

More specifically, the compound of the formula 4 may be selected from the following compounds:

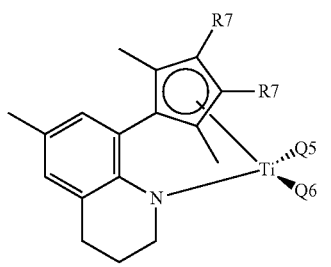

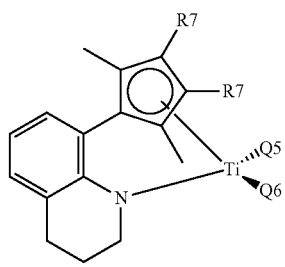

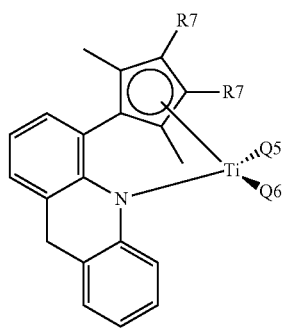

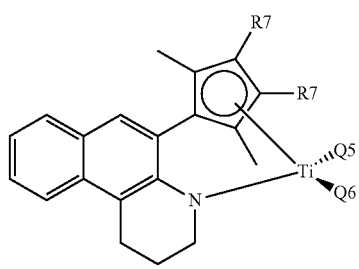

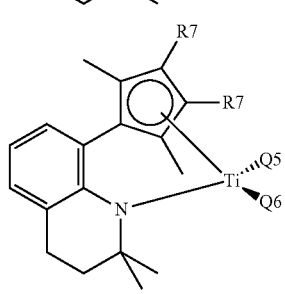

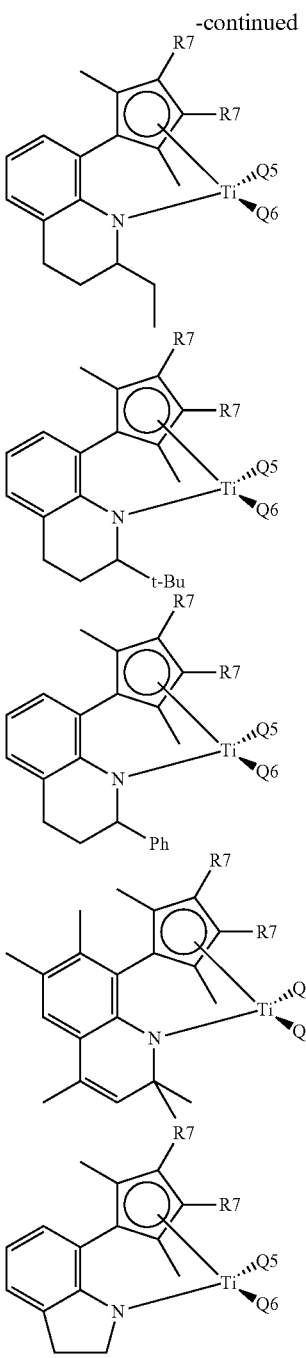

In the structural formulas, R7 is the same or different and is independently hydrogen or methyl; and Q5 and Q6 are the same of different and are independently methyl, dimethyl amido, or chloride.

The compound of the formula 4 structurally features a narrow angle of Cp-M-N and a wide angle of Q1-M-Q2 to which the monomer approaches, since the metal site is liked to the cyclopentadienyl ligand (Cp) with an introduced amido group as linked to the phenylene bridge in the form of a ring. Instead of the silicon-bridged CGC structure, the compound of the formula 3 has a more stable and rigid five-membered ring structure which forms a ring connection of cyclopentadiene liqand (Cp), phenylene bridge, nitrogen atom, and metal site. In other words, the nitrogen atom of the amido group is linked to the phenylene bridge through two bonds in the form of a ring to form a more rigid complex structure.

A variety of substituents can be introduced to a cyclopentadienyl ring or a quinoline ring. This facilitates the control of the electronic and stereoscopic environments around the metal atom to adjust the structure and properties of the polyolefin product. The compound of the formula 3 is preferably used for, if not limited to, preparation of a catalyst for polymerization of olefin monomers and may be useful in almost all other applications using the transition metal compound.

In the preparation method for a supported metallocene catalyst according to the embodiment, the supported metallocene catalyst may contain (a group 13 metal atom of the co-catalyst)/(a transition metal of the metallocene compound (e.g., the first and second metallocene compounds)) at a molar ratio of 1 to 10,000, preferably 1 to 1,000, more preferably 10 to 100. The molar ratio less than 1 can hardly produce catalytically active species due to an excessively small content of the group 13 metal in the co-catalyst, resulting in lower catalytic activity; whereas the molar ratio greater than 10,000 can cause an excess of the group 13 metal to function as catalyst poison.

The above-described preparation method can produce a supported metallocene catalyst with high catalytic activity using a relatively small amount of a co-catalyst and allow synthesis of a polyolefin with high bulk density in the presence of the supported metallocene catalyst.

In accordance with another embodiment of the invention, there is provided a supported metallocene catalyst prepared by the above-described method.

In accordance with still another embodiment of the invention, there is provided a method for preparing a polyolefin that comprises polymerizing an olefin-based monomer in the presence of the supported metallocene catalyst prepared by the above-described method.

The preparation method for polyolefin is to prepare a polyolefin having a high bulk density by preparing a supported metallocene catalyst according to the embodiment of the invention, and then polymerizing an olefin-based monomer in the presence of the supported metallocene catalyst.

In the preparation method for polyolefin, the supported metallocene catalyst may be used to polymerize an olefin-based monomer. The supported metallocene catalyst can also be used as a pre-polymerized catalyst as prepared through a contact reaction with the olefin-based monomer. For example, a separate catalyst can be put in contact with an olefin-based monomer, such as ethylene, propylene, 1-butene, 1-hexene, or 1-octene, to prepare a pre-polymerized catalyst for use as a catalyst.

The olefin-based monomer that can be polymerized using the supported metallocene catalyst may include ethylene, ┌-olefin, cyclic olefin, diene or triene olefin having at least two double bonds, or the like. The specific examples of the olefin-based monomer may include ethylene, propylene, 1-butene, 1-pentene, 4-methyl-1-pentene, 1-hexene, 1-heptene, 1-octene, 1-decene, 1-undecene, 1-dodecene, 1-tetracene, 1-hexadecene, 1-itocene, norbornene, norbornadiene, ethylidene norbornene, phenyl norbornene, vinyl norbornene, dicyclopentadiene, 1,4-butadiene, 1,5-pentadiene, 1,6-hexadiene, styrene, ┌-methyl styrene, divinylbenzene, 3-chloromethyl styrene, or the like. Further, at least two of these monomers may be mixed together to form a copolymer.

Preferably, the step of polymerizing the olefin-based monomer in the presence of the supported metallocene catalyst is conducted at 50 to 150° C.

The olefin polymerization process using the catalyst may be conducted according to a slurry process, a gas phase process, or a combination of slurry process and gas phase process. The slurry or gas-phase process is preferred.

In the preparation method for polyolefin, the supported metallocene catalyst may be dissolved in or diluted with a solvent, which includes C5-C12 aliphatic hydrocarbon solvents, such as pentane, hexane, heptane, nonane, decane, or their isomers; aromatic hydrocarbon solvents, such as toluene or benzene; or chlorine-substituted hydrocarbon solvents, such as dichloromethane or chlorobenzene. Preferably, the solvent as used herein is treated with a small amount of alkyl aluminum or used with an additional amount of the co-catalyst to eliminate a trace of water or air which functions as catalyst poison.

According to the embodiments, a supported metallocene catalyst and its preparation method are provided, where the supported metallocene catalyst contains catalyst components including a co-catalyst uniformly distributed deep into the whole carrier and thereby allows synthesis of polyolefins with high bulk density. Further, the catalyst can be used to facilitate the process for preparing polyolefins.

EXAMPLES

Hereinafter, the functions and effects of the invention will be described in further detail with reference to the specific examples of the invention, which examples are provided only to exemplify the invention but not intended to limit the scope of the invention.

Preparation Example 1

Preparation of First Metallocene Compound— [tBu—O—(CH$_2$)$_6$—C$_5$H$_4$]$_2$ZrCl$_2$ 6-chlorohexanol was used to prepare tBu—O—(CH$_2$)$_6$—Cl according to the known method (Tetrahedron Lett. 2951 (1988)), and tBu—O—(CH$_2$)$_6$—Cl was reacted with NaCp to yield tBu—O—(CH$_2$)$_6$—C$_5$H$_5$ (yield: 60%; and b.p.: 80° C./0.1 mmHg). Zirconium (Zr) was attached in the same manner to yield tBu—O—(CH$_2$)$_6$—C$_5$H$_4$]$_2$ZrCl$_2$ (yield: 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H);

$^{13}$C NMR (CDCl$_3$): 135.09, 116.66, 112.28, 72.42, 61.52, 30.66, 30.61, 30.14, 29.18, 27.58, 26.00.

Preparation Example 2

Preparation of Second Metallocene Compound— tBu—O—(CH$_2$)$_6$)(CH$_3$)Si(C$_5$(CH$_3$)$_4$)(tBu—N)TiCl$_2$ At the room temperature, to a 10 L reactor were added 50 g of Mg(s) and then 300 ml of THF. About 0.5 g of I$_2$ was added to the reactor, which was then kept at 50° C. Once the reactor temperature gets stable, 250 g of 6-t-buthoxyhexyl chloride was added to the reactor at a rate of 5 ml/min through a feeding pump. With the addition of 6-t-buthoxyhexyl chloride, the reactor temperature was increased by about 4 to 5° C. The reactor was stirred for 12 hours while 6-t-buthoxyhexyl chloride was continuously added. The 12-hour reaction resulted in a black solution. 2 ml of the black solution was collected and mixed with water to form an organic layer, which was then subjected to $^1$H-NMR to identify 6-t-buthoxyhexane. The analysis of the 6-t-buthoxyhexane showed that the Grignard reaction took place actively, thereby synthesizing 6-t-buthoxyhexyl magnesium chloride.

500 g of MeSiCl$_3$ and 1 L of THF were put in the reactor, which was then cooled down to −20° C. Part of the product, that is, about 560 g of 6-t-buthoxyhexyl magnesium chloride was added to the reactor at a rate of 5 ml/min through a feeding pump. After addition of the Grignard reagent, the reactor was stirred for 12 hours while gradually warmed up to the room temperature. The completion of the 12-hour reaction left a white MgCl$_2$ salt. The salt product was combined with 4 L of hexane and then subjected to a labdori machine to leave a salt-free filtrate. The filtrate was added to the reactor and removed of hexane at 70° C. to remain a light yellowish liquid. The liquid was analyzed through $^1$H-NMR to identify methyl(6-t-buthoxy hexyl)dichlorosilane as the desired product.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethyl cyclopentadiene and 2.4 L of THF were put in a reactor, which was then cooled down to −20° C. 480 mL of n-BuLi was added to the reactor at a rate of 5 ml/min through a feeding pump. After addition of n-BuLi, the reactor was stirred for 12 hours while gradually warmed up to the room temperature. After completion of the 12-hour reaction, an equivalent weight (326 g, 360 ml) of methyl(6-t-buthoxy hexyl)dichlorosilane was rapidly added to the reactor, which was then stirred for 12 hours while gradually warmed up to the room temperature. The reactor was cooled down to 0° C. 2 equivalent weight of t-BuNH$_2$ was added to the reactor, which was then stirred for 12 hours while warmed up to the room temperature. After the 12-hour reaction, the solution was removed of THF, combined with 4 L of hexane, and then subjected to a labdori machine to remain a salt-free filtrate. The filtrate was added to the reactor and removed of hexane at 70° C. to remain a yellowish solution. The solution was analyzed through $^1$H-NMR to identify methyl(6-t-buthoxy hexyl)(tetramethyl CpH)-t-butylaminosilane as the desired product.

10 mmol of TiCl(THF) was rapidly added to the dilithium salt of the ligand (at 70° C.) which was synthesized from n-BuLi and dimethyl(tetramethyl CpH)-t-butylaminosilane in the THF solution. The resultant solution was gradually warmed up from −78° C. to the room temperature and stirred for 12 hours. After the 12-hour agitation, an equivalent weight (10 mmol) of PbCl$_2$ was added to the solution at the room temperature and then stirred for 12 more hours to yield a dark bluish black solution. The resultant solution was removed of THF, mixed with hexane, and then filtered out to eliminate hexane. The hexane-free filtrate thus obtained was analyzed through H-NMR to identify (tBu—O—(CH$_2$)$_6$)(CH$_3$)Si(C$_5$(CH$_3$)$_4$)(tBu—N)TiCl$_2$ as a desired product which as [methyl (6-t-buthoxyhexyl)silyl(5-tetramthylCp)(t-butylamido)] TiCl$_2$).

$^1$H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Example 1

Preparation of Supported Metallocene Catalyst

Carrier

Silica (XPO2410 manufactured by Grace Davison) was used as a carrier.

Immobilization of MAO

To a glass reactor were added 10 g of the silica as a carrier, 100 ml of toluene, and then a methylaluminoxane (MAO) solution containing 40 mmol of aluminum in toluene. The resultant solution was stirred at 80° C. for one hour to bring about a gradual reaction. Then, the MAO solution containing 40 mmol of aluminum was added again to the reactor, which was under agitation at 50° C. for one hour to initiate a gradual reaction. The resultant solution was washed with an excess of toluene to eliminate the aluminum compound remaining without participating in the reaction.

Preparation of Supported Metallocene Catalyst

To the MAO-immobilized catalyst was added a toluene solution containing a second metallocene compound. The resultant solution was stirred at 40° C. for one hour to initiate the reaction. After addition of a toluene solution containing a first metallocene compound, the resultant solution was stirred at 40° C. for one more hour to initiate the reaction, washed with an excess of toluene and then dried under vacuum to yield as a solid powder which was a supported metallocene catalyst containing the first and second metallocene compounds each immobilized in an amount of 0.06 mmol per 1 g of the carrier.

Example 2

Preparation of Supported Metallocene Catalyst

The procedures were conducted to obtain a supported metallocene catalyst in the same manner as described in Example 1, excepting that the MAO immobilization reaction was carried out separately at 90° C. and 50° C. for one hour each time, rather than at 80° C. and 50° C. for one hour each time.

Example 3

Preparation of Supported Metallocene Catalyst

The procedures were conducted to obtain a supported metallocene catalyst in the same manner as described in Example 1, excepting that the MAO immobilization reaction was carried out separately at 80° C. and 40° C. for one hour each time, rather than at 80° C. and 50° C. for one hour each time.

Comparative Example 1

For a methylaluminoxane (MAO) immobilization reaction, 10 g of the silica was put in a glass reactor and mixed with 100 ml of toluene. To the toluene solution was added a MAO solution containing 40 mmol of aluminum, and the resultant solution was stirred at 50° C. for one hour to initiate a gradual reaction. After a second addition of the MAO solution containing 40 mmol of aluminum, the resultant solution was stirred at 80 for one hour to initiate the reaction and washed with an excess of toluene to eliminate the aluminum compound remaining without participating in the reaction.

The procedures were conducted to obtain a supported metallocene catalyst in the same manner as described in Example 1, except for the MAO immobilization reaction.

Comparative Example 2

For a methylaluminoxane (MAO) immobilization reaction, 10 g of the silica was put in a glass reactor and mixed with 100 ml of toluene. To the toluene solution was added a MAO solution containing 80 mmol of aluminum, and the resultant solution was stirred at 80° C. for 2 hours to initiate a gradual reaction and washed with an excess of toluene to eliminate the aluminum compound remaining without participating in the reaction.

The procedures were conducted to obtain a supported metallocene catalyst in the same manner as described in Example 1, except for the MAO immobilization reaction.

Comparative Example 3

For a methylaluminoxane (MAO) immobilization reaction, 10 g of the silica was put in a glass reactor and mixed with 100 ml of toluene. To the toluene solution was added a MAO solution containing 80 mmol of aluminum, and the resultant solution was stirred at 50° C. for 2 hours to initiate a gradual reaction and washed with an excess of toluene to eliminate the aluminum compound remaining without participating in the reaction.

The procedures were conducted to obtain a supported metallocene catalyst in the same manner as described in Example 1, except for the MAO immobilization reaction.

Experimental Example

Semibatch Ethylene Polymerization 20 mg of each of the supported catalysts prepared in Example 1, 2 and 3 and Comparative Example 1, 2 and 3 was weighed in a dry box and put in a 50 ml glass bottle, which was sealed with a rubber membrane and taken out of the dry box to make the catalyst ready. Polymerization was conducted in a 2 L metal alloy reactor equipped with a mechanical agitator, temperature-controllable and used under high pressure.

To the reactor were added hexane (1 L) containing 0.5 mmol of triethylaluminum, 1-hexane (20 mL), and then each of the supported catalysts without contact with air. Then, a gaseous ethylene monomer was continuously added to the reactor under a pressure of 40 Kgf/cm$^2$ at 80° C. to cause the polymerization reaction for one hour. The polymerization reaction was terminated by stopping agitation and guiding the ethylene gas away from the reactor.

The polymer product thus obtained was removed of almost the polymerization solution and then dried in an oven at 70° C. for 4 hours.

The catalysts prepared in Examples 1, 2 and 3 and Comparative Examples 1, 2 and 3 were measured in regard to catalytic activity and bulk density. The measurement results are presented in Table 1 below.

TABLE 1

| | Example | | | Comparative Example | | |
|---|---|---|---|---|---|---|
| | 1 | 2 | 3 | 1 | 2 | 3 |
| Immobilization Temperature (° C.) ($1^{st}/2^{nd}$) | 80/50 | 90/50 | 80/40 | 50/80 | 80 | 50 |
| Immobilization Time (hour) ($1^{st}/2^{nd}$) | 1/1 | 1/1 | 1/1 | 1/1 | 2 | 2 |
| Co-catalyst (mmol/g carrier) | 4/4 | 4/4 | 4/4 | 4/4 | 8 | 8 |
| Activity (kg/g catalyst) | 10.2 | 9.3 | 10.4 | 8.2 | 7.8 | 10.5 |
| Bulk Density (g/ml) | 0.403 | 0.404 | 0.398 | 0.377 | 0.402 | 0.361 |

Referring to Table 1, the supported metallocene catalysts which were prepared by conducting first and second immobilizations of a co-catalyst respectively at high and low temperatures and then immobilization of a metallocene compound as described in Examples 1, 2 and 3 showed a high catalytic activity greater than 9.2 kg/g catalyst and enabled polymerization of polyolefin with high bulk density greater than 0.395 g/ml.

Contrarily, the supported metallocene catalysts prepared by a single step of co-catalyst immobilization (in Comparative Examples 2 and 3) showed a low catalytic activity and was used to prepare a polyolefin with low bulk density, thereby causing deterioration of productivity. Further, the supported metallocene catalyst prepared by immobilizing a co-catalyst sequentially at low and high temperatures (in Comparative Example 1) also exhibited a low catalytic activity and provided the polyolefin with low bulk density.

The invention claimed is:

1. A method for preparing a supported metallocene catalyst, comprising:
    first immobilizing part of a co-catalyst on a carrier at a first temperature;
    second immobilizing the remainder of the co-catalyst on the carrier at a second temperature lower than the first temperature; and
    immobilizing a metallocene compound on the carrier.

2. The method as claimed in claim 1, wherein the step of immobilizing the metallocene compound comprises:
    immobilizing a first metallocene compound on the carrier; and
    immobilizing a second metallocene compound on the carrier.

3. The method as claimed in claim 1, wherein the first temperature is 60 to 100° C. and the second temperature is 25 to 55° C.

4. The method as claimed in claim 1, wherein the weight ratio of the first immobilized co-catalyst to the second immobilized co-catalyst is 3:7 to 7:3.

5. The method as claimed in claim 1, wherein the co-catalyst comprises a metallic compound containing a group 13 metal atom.

6. The method as claimed in claim 1, wherein the co-catalyst comprises a compound represented by the following formula 1:

—[Al(R15)-O]a- [Formula 1]

wherein R15 is the same or different, each being halogen, or halogen-substituted or unsubstituted C1-C20 hydrocarbyl; and a is an integer of 2 or greater.

7. The method as claimed in claim 1, wherein the co-catalyst comprises at least one compound selected from the group consisting of methylaluminoxane (MAO), ethylaluminoxane, isobutylaluminoxane, and butylaluminoxane.

8. The method as claimed in claim 1, wherein the carrier has a hydroxyl group or a silanol group on the surface thereof.

9. The method as claimed in claim 8, wherein the carrier contains 0.1 to 10 mmol/g of the hydroxyl group on the surface thereof.

10. The method as claimed in claim 1, wherein the carrier is dried at 200 to 800° C.

11. The method as claimed in claim 1, wherein the carrier comprises at least one selected from the group consisting of silica, silica-alumina, and silica-magnesia.

12. The method as claimed in claim 2, wherein the first metallocene compound comprises a compound represented by the following formula 2, and the second metallocene compound comprises a compound represented by the following formula 3 or 4:

$(C_5R^a)_p(C_5R^b)MQ_{3-p}$ [Formula 2]

wherein M is a group 4 transition metal atom;

$C_5R^a$ and $C_5R^b$ are the same or different, each being a cyclopentadienyl ligand of a group 14 metal atom substituted with at least one group selected from the group consisting of hydrogen, alkyl, cyclalkyl, aryl, alkenyl, alkylaryl, arylalkyl, arylalkenyl, and hydrocarbyl, wherein two groups bonded to adjacent carbon atoms of $C_5$ are optically bonded together via hydrocarbyl to form at least one ring containing 4 to 16 carbon atoms;

Q is selected from the group consisting of halogen, alkyl, alkenyl, aryl, alkylaryl, arylalkyl, and alkylidene; and p is 0 or 1,

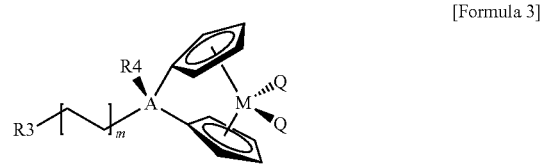
[Formula 3]

wherein M is a group 4 transition metal atom;

R3 and R4 are the same or different, each being hydrogen, C1-C20 alkyl, C2-C20 alkenyl, C6-C20 aryl, C7-C40 alkylaryl, C7-C40 arylalkyl, C1-C20 alkylsilyl, C6-C20 arylsilyl, mthoxymethyl, t-butoxymethyl, tetrahydropyranyl, tetrahydrofuranyl, 1-ethoxyethyl, or 1-methyl-1-methoxyethyl;

A is selected from the group consisting of

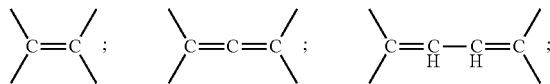

silicon and germanium;

Q is the same or different, each being selected from the group consisting of halogen, C1-C20 alkyl, C2-C10 alkenyl, C7-C40 alkylaryl, C7-C40 arylalkyl, C6-C20 aryl, substituted or unsubstituted C1-C20 alkylidene, substituted or unsubstituted amino, C2-C20 alkylalkoxy, and C7-C40 arylalkoxy; and m is an integer from 0 to 10,

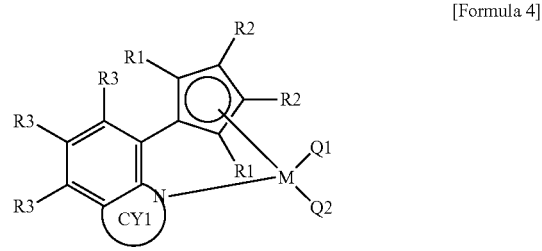
[Formula 4]

wherein R1 and R2 are the same or different, each being hydrogen, C1-C20 alkyl, C2-C20 alkenyl, C6-C20 aryl, silyl, C7-C20 alkylaryl; C7-C20 arylalkyl, or hydrocarbyl-substituted metalloid of a group 4 metal atom, wherein R1 and R2, or two of R2s are optionally bonded together via alkylidine containing C1-C20 alkyl or C6-C20 aryl to form a ring;

R3 is the same or different, each being hydrogen, halogen, C1-C20 alkyl, C2-C20 alkenyl, C6-C20 aryl, C7-C20 alkylaryl, C7-C20 arylalkyl, C1-C20 alkoxy, C6-C20 aryloxy, or amido, wherein at least two of R3s are optionally bonded together to form an aliphatic or aromatic ring;

CY1 is a substituted or unsubstituted aliphatic or aromatic ring, wherein CY1 is optionally further substituted with at least one substituent selected from the group consisting of halogen, C1-C20 alkyl, C2-C20 alkenyl, C6-C20 aryl, C7-C20 alkylaryl, C7-C20 arylalkyl, C1-C20 alkoxy, C6-C20 aryloxy, and amido, wherein if substituents are plural, at least two of the substituents are optionally bonded together to form an aliphatic or aromatic ring;

M is a group 4 transition metal atom; and

Q1 and Q2 are the same or different, each being halogen, C1-C20 alkyl, C2-C20 alkenyl, C6-C20 aryl; C7-C20 alkylaryl, C7-C20 arylalkyl, C1-C20 alkyl amido, C6-C20 aryl amido, or C1-C20 alkylidene.

13. The method as claimed in claim 12, wherein at least one hydrogen contained in $R^a$ and $R^b$ of the formula 2 is substituted with at least one radical selected from the group consisting of compounds represented by the following formulas a, b and c:

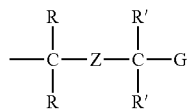

[Formula a]

wherein Z is oxygen or sulfur;

R and R' are the same or different, each being selected from the group consisting of hydrogen, alkyl, cycloalkyl, aryl, alkenyl, alkylaryl, arylalkyl, and arylalkenyl, wherein two of R's are optionally bonded together to form a ring; and G is selected from the group consisting of alkoxy, aryloxy, alkylthio, arylthio, and substituted or unsubstituted phenyl, wherein G is optionally bonded to R' to form a ring, wherein when Z is sulfur, G is alkoxy or aryloxy, wherein when G is alkylthio, arylthio, or substituted or unsubstituted phenyl, Z is oxygen,

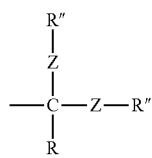

[Formula b]

wherein Z is oxygen or sulfur, wherein at least either one of two Z is oxygen; and R and R" are the same or different, each being selected from the group consisting of hydrogen, alkyl, cycloalkyl, aryl, alkenyl, alkylaryl, arylalkyl, and arylalkenyl, wherein R are optionally bonded to R" to form a ring, and two of R"s are optionally bonded together to form a ring, when two of R"s is not hydrogen; and

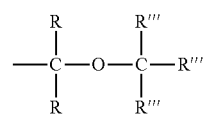

[Formula c]

wherein R and R''' are the same or different, each being selected from the group consisting of hydrogen, alkyl, cycloalkyl, aryl, alkenyl, alkylaryl, arylalkyl, and arylalkenyl, wherein adjacent two of R'''s may be are optionally bonded together to form a ring, wherein when at least one of R is hydrogen, none of R''' is hydrogen, wherein when at least one of R''' is hydrogen, none of R is hydrogen.

14. The method as claimed in claim 12, wherein the compound of the formula 3 is a compound represented by the following formula 5:

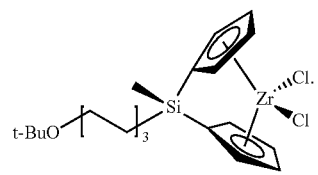

[Formula 5]

15. The method as claimed in claim 12, wherein the compound of the formula 4 is a compound represented by the following formula 6 or 7:

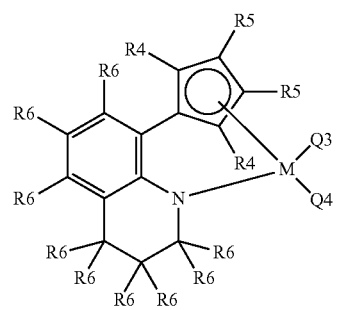

[Formula 6]

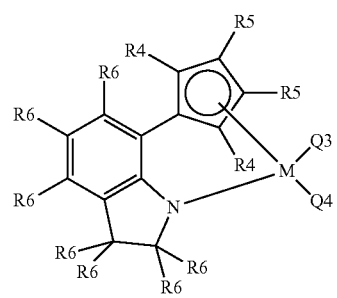

[Formula 7]

wherein R4 and R5 are the same or different, each being hydrogen, C1-C20 alkyl, C6-C20 aryl, or silyl;

C6 is the same or different, each being hydrogen, C1-C20 alkyl, C2-C20 alkenyl, C6-C20 aryl, C7-C20 alkylaryl, C7-C20 arylalkyl, C1-C20 alkoxy, C6-C20 aryloxy, or amido, wherein at least two of R6s are optionally bonded together to form an aliphatic or aromatic ring;

Q3 and Q4 are the same or different, each being halogen, C1-C20 alkyl, C1-C20 alkyl amido, or C6-C20 aryl amido; and M is a group 4 transition metal atom.

16. The method as claimed in claim 5, wherein the cocatalyst is a group 13 metal atom containing compound, and the molar ratio of (the group 13 metal atom of the co-catalyst)/(the transition metal of the metallocene compound) is 1 to 10,000.

17. The method as claimed in claim 2, wherein the co-catalyst is immobilized in a total amount of 6 to 10 mmol per 1 g of the carrier, and the first and second metallocene compounds are immobilized each in an amount of 0.05 to 0.2 mmol per 1 g of the carrier.

* * * * *